United States Patent [19]

Roggenstein et al.

[11] 4,064,388

[45] Dec. 20, 1977

[54] DECODER CLUTCHING SYSTEM FOR MINICOMPUTERS

[75] Inventors: Edwin O. Roggenstein; Chockalingam Manthiram, both of Plymouth, Mich.

[73] Assignee: Burroughs Corporation, Detroit, Mich.

[21] Appl. No.: 638,684

[22] Filed: Dec. 8, 1975

Related U.S. Application Data

[63] Continuation-in-part of Ser. No. 528,437, Nov. 29, 1974, abandoned.

[51] Int. Cl.$^2$ .......... G06K 1/00

[52] U.S. Cl. .......... 235/61 A; 340/365 R; 178/17 D; 178/81; 192/84 R

[58] Field of Search .......... 235/61 R, 61 A; 340/365; 250/222, 561; 178/81, 17 D; 192/84 R, 84 P; 197/1 R, 98; 318/480

[56] References Cited

U.S. PATENT DOCUMENTS

| | | | |
|---|---|---|---|
| 3,258,094 | 6/1966 | Zechnall | 192/84 R |
| 3,261,914 | 7/1966 | Evans, Jr. | 178/81 |
| 3,305,062 | 2/1967 | Kittredge | 197/1 R |
| 3,539,723 | 11/1970 | Matjke | 178/81 |
| 3,662,382 | 5/1972 | Janis | 340/365 |
| 3,754,631 | 8/1973 | Wang et al. | 197/1 R |
| 3,873,843 | 3/1975 | Martin | 250/561 |

*Primary Examiner*—Robert K. Schaefer
*Assistant Examiner*—Vit W. Miska
*Attorney, Agent, or Firm*—David R. Syrowik; Leon E. Redman; Carl Fissell, Jr.

[57] ABSTRACT

A decoder clutching system for use in a minicomputer such as the Burroughs Series-L or TC-Series minicomputer is employed to reduce noise and extend the life of the decoder while minimizing power consumption. An electromagnetic master clutch is secured to a main motor which enables a decoder to be intermittently driven in response to decoder alert or command signals representing anticipated binary to decimal conversion by the decoder. The motor operates continuously so as to drive the decoder only when the electromagnetic master clutch is energized and to release the drive to the decoder when the master clutch is de-energized.

5 Claims, 6 Drawing Figures

DECODER CLUTCHING SYSTEM FOR MINICOMPUTERS

CROSS-REFERENCE TO RELATED APPLICATION

This application is a continuation-in-part of co-pending prior application Ser. No. 528,437 filed on Nov. 29, 1974 for "Decoding Clutching System for Minicomputers" of the same inventive entity and co-ownership herewith, now abandoned.

BACKGROUND OF THE INVENTION

There are many types of electronic data processing minicomputers, such as the Burroughs Series-L machine which is described in Burroughs Technical Manual Form 1033388 entitled "Series-L Electronic Billing Computer" which was copyrighted in 1969 by Burroughs Corporation, which employ a decoder to convert electrical signals which are coded in digital values into equivalent mechanical movements. Such decoders are often driven continuously from a main motor. The continuous operation of the decoder results in a greater amount of noise, wear and tear to the decoder unit itself, and to a shortened machine life and excessive power consumption.

SUMMARY OF THE INVENTION

It is an object of this invention to provide a decoder clutching system for reducing the noise inherent in a continuously-operated decoder.

It is a further object of the present invention to reduce mechanical wear on the decoder while also reducing power consumption.

It is a further object of the present invention to provide a decoder clutching system wherein an electromagnetic clutch is secured to the motor which drives the decoder unit and wherein the decoder clutching system includes a control system for selectively energizing or de-energizing the electromagnetic clutch in response to command signals.

It is still a further object of the present invention to provide a decoder clutching system wherein a master clutch is secured to the motor which drives the decoder unit, wherein a clutch control system operates to selectively energize or de-energize the master clutch in response to generated command signals, and wherein a drive trip latch assembly associated with the keyboard of the minicomputer employing the decoder is used to sense the depression of any key for generating such command signals.

These and other objects and advantages of the present invention are accomplished in a decoder clutching system wherein an electromagnetic master clutch is secured to a drive motor which drives a decoder unit. A control system is used to selectively energize or de-energize the electromagnetic clutch so as to terminate the drive to the decoder unit during those intervals in which its use is not required, thereby reducing noise and increasing the life of the unit. A drive trip latch mechanism from the keyboard assembly is modified so that the depression of any key on the keyboard will cause the logic to energize and hold the clutch energized for a sufficient time delay pre-set in the clutch control logic to maintain drive power to the decoder for a predetermined time interval of anticipated binary to decimal conversion requirement by the minicomputer. The clutch control logic also responds to other command signals from the remainder of the minicomputer for similarly energizing the electromagnetic master clutch in response to the demands of the system.

Figure 3:
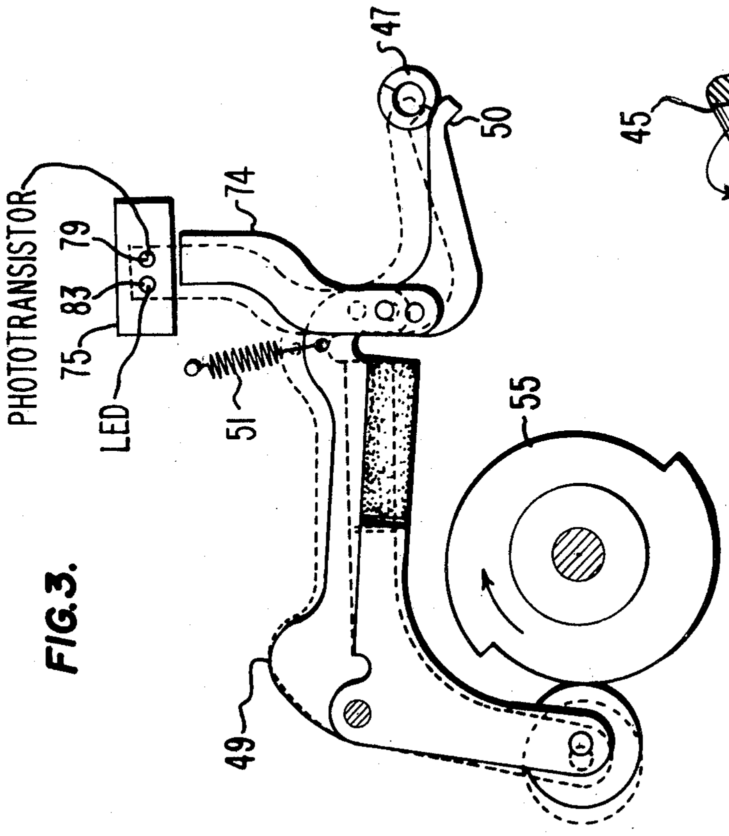
FIG. 3 is an exploded view of a modified drive trip latch assembly utilized in the present invention.
Figure 4:
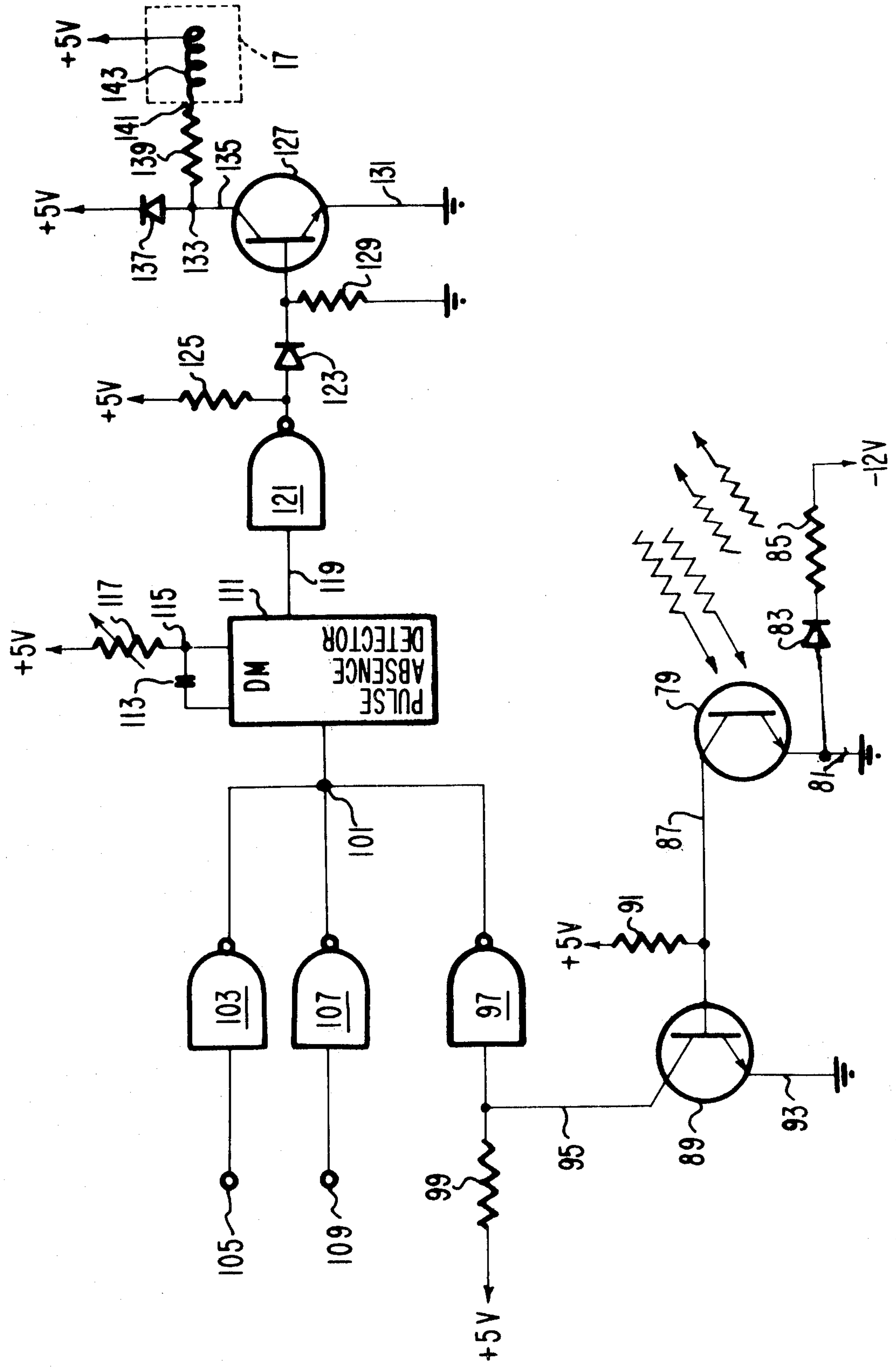
Figure 5:
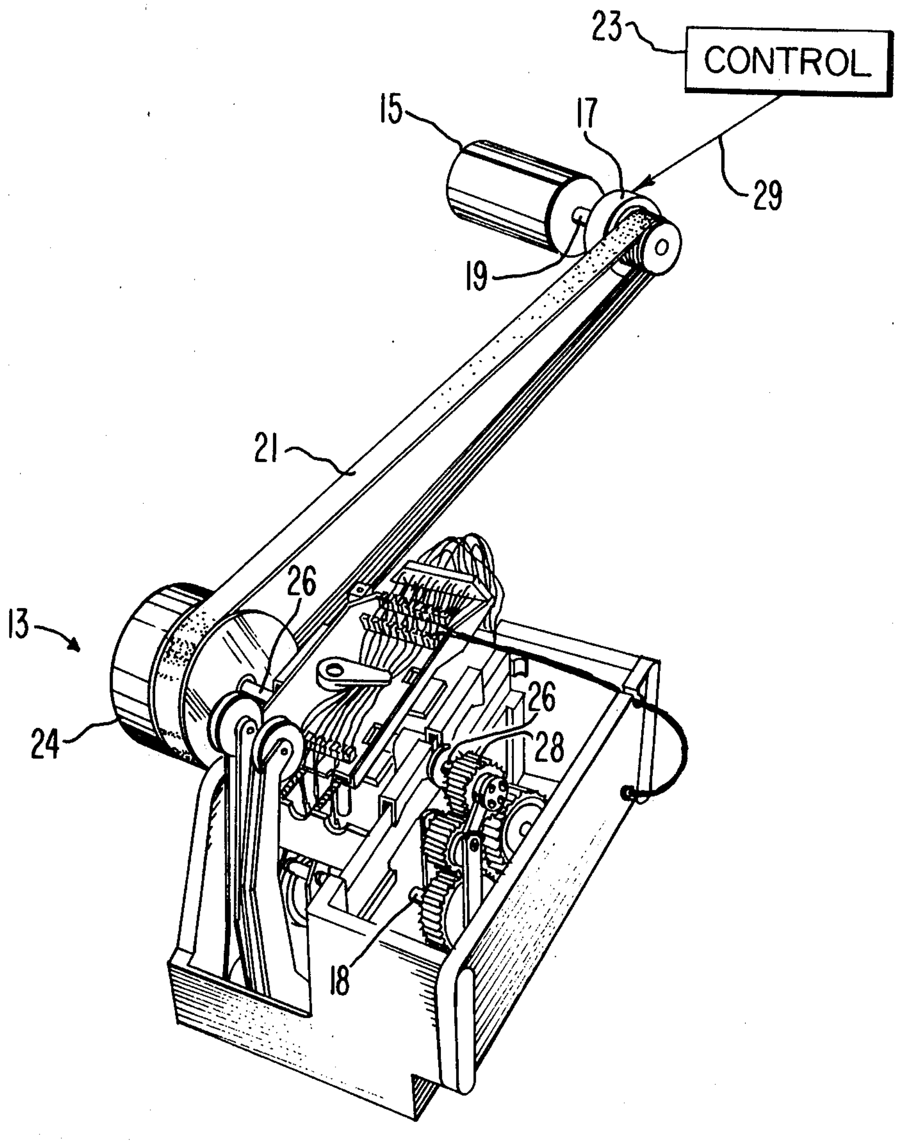

FIG. *3a* is a perspective view of a latching trip 50 and collar 47 of the assembly of FIG. 3;

FIG. 4 is a schematic diagram of the electrical portion of the clutch control system of the present invention; and FIG. 5 is a perspective view of the decoder clutching system of the present invention illustrating a belt and gear system through which the main motor and master clutch may drive the decoder.

DETAILED DESCRIPTION OF THE INVENTION

Figure 1:
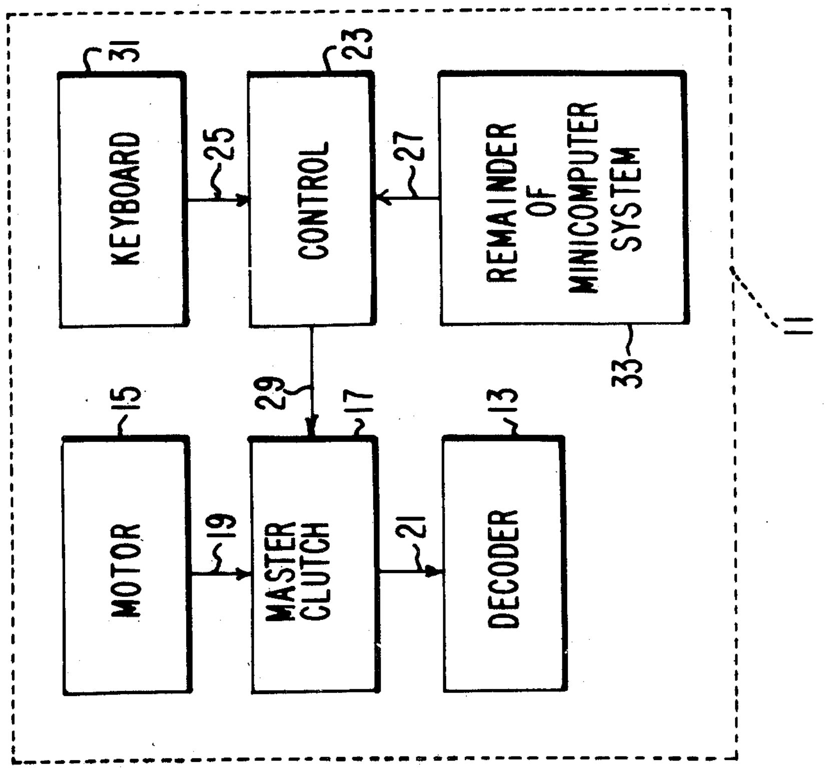
FIG. 1 is a block diagram of an electronic data processing system such as a minicomputer employing the decoder clutching system of the present invention.

FIG. 1 is a block diagram of an electronic data processing system such as a minicomputer employing the decoder clutching system of the present invention. The block 11 which is formed by dotted lines represents an electronic data processing computer or minicomputer such as the Burroughs Series-L or TC-Series line of business machines. The minicomputer system 11 is shown as containing a decoder unit 13 and a main motor 15 which are used to drive the decoder unit. An electromagnetic master clutch 17 is secured to the motor via securing means such as a shaft 19, and the electromagnetic master clutch 17 contains a clutch coil 143 (FIG. 4) which can be energized, as known in the art, to enable the master clutch 17 to supply drive energy to the decoder 13 via coupling means 21, such as a shaft, described in more detail with reference to FIG. 5.

The electronic clutch control system of the present invention is represented by block 23 and responds to an alert or other command signals present at clutch control inputs 25 and 27 to control the generation of an energization signal onto lead 29. When an energization signal is supplied from the clutch control system 23 to the electromagnetic master clutch 17 via lead 29, the clutch coil 143 (FIG. 4) is energized and the electromagnetic master clutch 17 operates to enable the motor 15 to drive the decoder 13, as explained hereinafter. When the clutch coil 143 (FIG. 4) of clutch 17 is de-energized, the motor drive is decoupled from the decoder 13 for reducing noise and energy consumption while also saving wear and tear on the decoder unit. The minicomputer 11 is also shown as having a keyboard assembly 31 and the present invention teaches a modification of the keyboard assembly as illustrated in FIGS. 3 and *3a*, such that an alert command signal will be generated in response to the depression of any of the keys of the keyboard 31 and passed via lead 25 to the clutch control system 23 for energizing or de-energizing the master clutch 17. Block 33 represents the remainder of the minicomputer and it is capable of supplying a command signal via lead 27 to clutch control system 23 under either of two conditions. Under the first condition, block 33 will pass a control signal on lead 27 when the decoder is restored to its home position a predetermined time after the decoder is initially turned on. Under the second condition, a command signal will be passed via lead 27 to the clutch control system 23 whenever the minicomputer is executing any kind of a program or set of internal instructions which could require the operation of the decoder unit 13.

The decoder unit of block 13 converts electrical signals coded in digital values into equivalent mechanical movement as known in the art. Electrical signals which were coded in binary form are converted into mechanical movements of equivalent decimal values. In the decoder unit described in the Burroughs manual previously cited and which is incorporated by reference herein, various alphanumeric characters are arranged in columns and rows around the outside periphery of a sphere. The column and row of the alpha-numeric character determines its digital address. Selection of a particular character to be printed causes a decoding matrix to provide electrical pulses to the solenoids in the decoder which permit mechanical movement for high speed serial printing. Character selection may be indexed by the depression of a key, tape fed into the memory loader, or characters read from storage in memory. Each of the solenoids in the decoder operates an individually associated half revolution clutch which enables the movement of an eccentrically mounted ring member to one of two positions. Each position of the eccentric ring member represents a binary quantity. The movement of the rings through a linkage produces a mechanical movement which is equal to the decimal equivalent of the binary output from the decoding matrix. Such decoder units are well-known in the art. For a more thorough understanding of such a decoder, reference should be made to U.S. Pat. No. 3,250,464 issued to G. K. Caspari on May 10, 1966 for "Binary to Decimal Converter", which is of co-ownership herewith and hereby expressly incorporated by reference.

Figure 2:
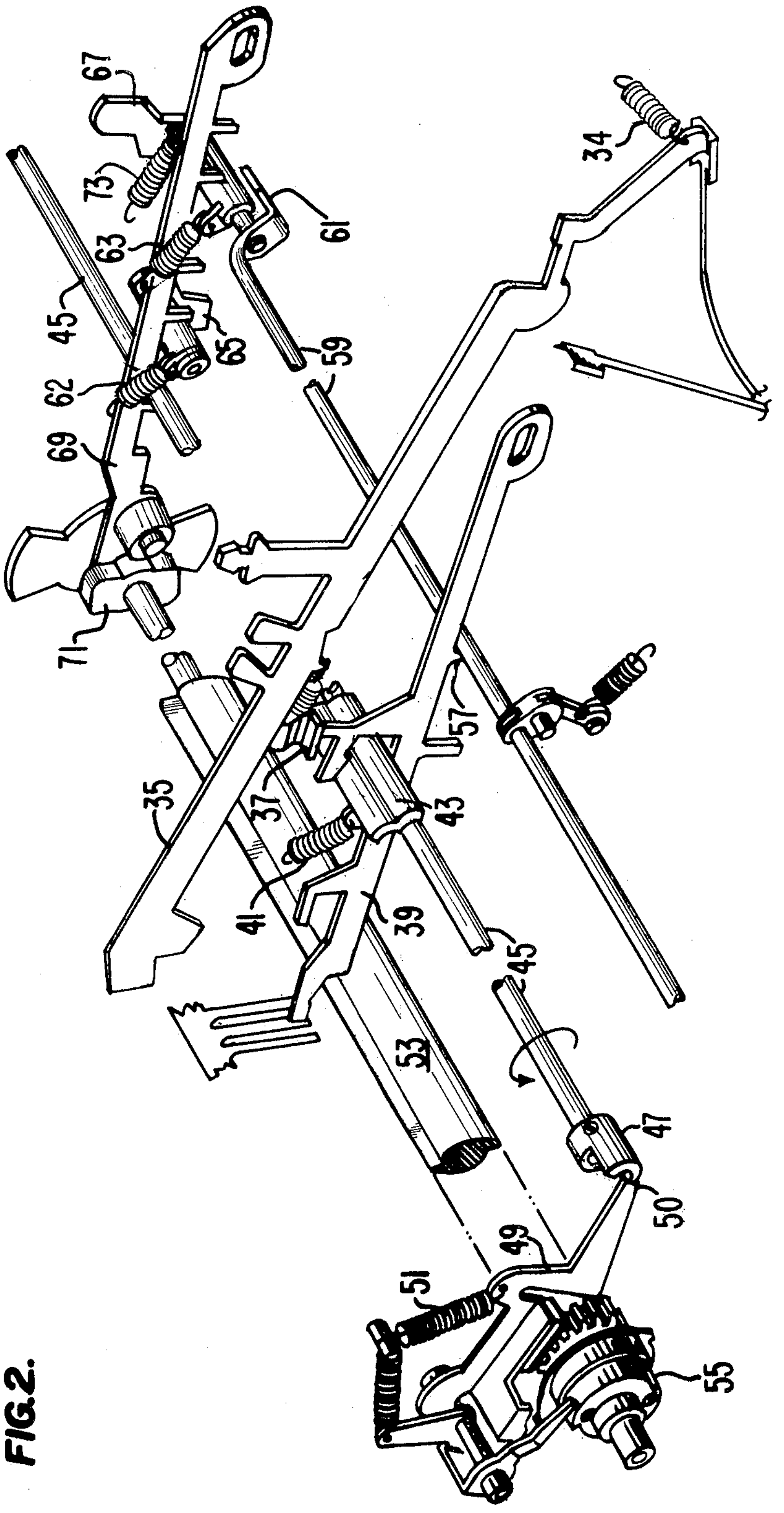
FIG. 2 is a perspective illustration of a portion of a keyboard apparatus used in the minicomputer system of FIG. 1 showing the key lever operation and drive trip latch assembly used in prior art keyboard apparatus.

The specific type of drive motor 15, the specific type of electromagnetic master clutch 17, and the specific details of the overall arrangement of the minicomputer itself are not necessary for a complete understanding of the present invention. FIG. 2 shows a portion of a prior art keyboard assembly with particular detail shown for the key lever operation and the drive trip latch mechanism. When any of the keys of the keyboard apparatus are depressed, the key lever 35 is depressed. When key lever 35 is depressed, its pass-by pawl 37 contacts interposer 39 so as to lower the interposer against the upward bias of a latch spring 41. As interposer 39 moves downward, it contacts trip bail 43 causing it to rotate in a counterclockwise fashion as shown by the arrow in FIG. 2. Trip bail 43 has rigidly secured thereto a shaft 45 which in turn rotates counterclockwise, as viewed in FIGS. 2 and 3*a*, with the rotation of trip bail 43. At the far end of shaft 45 is a collar element 47 which is rigidly secured to and rotates with the shaft 45. A drive trip latch mechanism 49 has a latching tip 50 which normally rests against an outward projection 46 (FIG. 3*a*) of the collar 47. However, when the collar 47 is rotated counterclockwise by the shaft 45 in response to the rotation of the bail 45, the latching tip 50 of the drive trip latch 49 is released from the collar 47 and raised via the upward bias of a spring 51. When the drive trip latch 49 is raised by the spring 51, it enables filter shaft 53 to be rotated 180° by allowing the 180° cam mechanism 55, which is rigidly secured to the filter shaft 53 to rotate 180° in a clockwise direction as seen in FIGS. 2 and 3.

As the filter shaft 53 rotates clockwise, it drives the interposer 39 forward or toward the right as viewed in FIG. 2, and urges the lower projection 57 of interposer 39 to engage the bail mechanism 59, thereby moving it also forward. The forward movement of the bail mechanism 59 enables the bail foot 61 to release the keyboard flag latches as shown in the art. This enables the spring 62 to move flag 65 forward while spring 63 urges flag 67 rearward to contact slide 69. When the cam member 71, which is rigidly secured to the filter shaft 53, is rotated, spring 73 pulls the slide 69 rearward, or to the left as viewed in FIG. 2, permitting all of the released keyboard flags to position in front of their respective cores (not shown). As previously stated, this type of keyboard apparatus is old in the art and a more detailed description may be obtained by reference to the previously cited Burroughs manual or to U.S. Pat. No. 3,562,493 issued to B. J. Malkowski et al on Feb. 9, 1971, of co-ownership herewith and hereby expressly incorporated by reference.

FIG. 3 shows the modified drive trip latch mechanism of the present invention. The basic drive trip latch 49 remains the same as was shown in FIG. 2 and its effect upon the 180° cam mechanism 55 likewise remains the same. The drive trip latch mechanism is shown in solid lines for its normal position and in dotted lines to represent its released position. A latch extension member 74 is attached to the foward end or right side as viewed in FIG. 3 of the latch mechanism 49 and extends vertically upward therefrom. An inside face of the upper end of the extension member 74 is polished or otherwise reflective.

A photoelectric assembly 75 is positioned immediately above the upper end of extension member 74 when the drive trip latch mechanism 49 is in its normal position. The photoelectric assembly 75 includes a light emitting diode (LED) 83 which directs a beam of light toward the reflective inner face of the extension member 74 disposed opposite the photoelectric assembly 75 when the extension member is released by the collar into its raised position. A phototransitor 79 receives the light reflected from the reflective inner face of the extension member 74 when it is in the raised position. The phototransistor 79 then responds to the presence of the reflected light for generating an electrical alert or command signal.

Figure 3A:
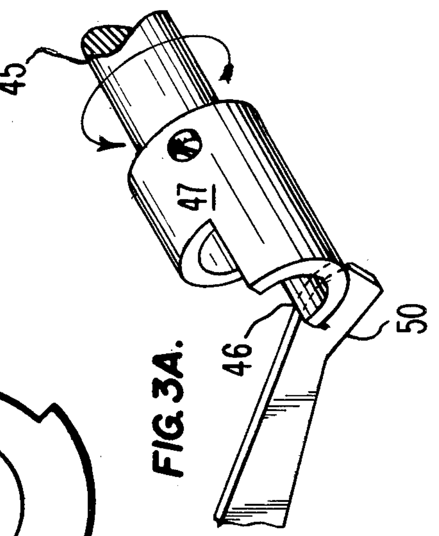

With reference to FIGS. 2, 3 and 3*a*, the operation of the drive trip latch mechanism of the present invention is as follows: When any key of the keyboard assembly of block 31 (FIG. 1) is depressed, a corresponding key lever 35 (FIG. 2) will be depressed and the bail 43 will rotate in a counterclockwise manner as shown in FIG. 2. This counterclockwise rotation of bail 43 will cause the shaft 45 to turn the collar 47 in a counterclockwise direction. As can be seen from FIG. 3 and FIG. 3*a*, the normal position of the collar 47 before it is rotated in a counterclockwise manner, holds the forward end 50 of the drive trip latch mechanism 49 so as to retain the drive trip latch mechanism in the "normal" position with the reflective surface of the upper end of the extension member 74 disposed below the level of the photoelectric assembly 75. When a key depression causes the counterclockwise rotation of sleeve 47, the forward end 50 of the drive trip latch mechanism 49 is released and the drive trip latch mechanism 49 will be raised under the influence of spring 51 to its upward or "released" position as shown by the dotted lines of FIG. 3. In the "released" position, the reflective face of the extension member 74 is in front of the photoelectric assembly 75 and the beam of light which is emitted from the light emitting diode 83 is reflected from the reflecting surface of extension member 74 onto the phototransistor 79. The phototransistor 79 is activated as described in the description of the electrical circuit of the present invention found in FIG. 4. When the latch trip mechanism is in the released position, the 180° cam member 55 is rotated clockwise as seen in FIGS. 2 and 3 through 180° causing it to reset the drive trip latch mechanism 49 to its "normal" position. When the 180° cam 55 is rotated, filter shaft 53 rotates clockwise as viewed in FIG. 2 and drives the interposer 39 (FIG. 2) forward allowing spring 41 (FIG. 2) to raise the interposer 39. This is possible since the key lever 35 is restored to its normal position under the bias applied by spring 34 when pressure is removed from the key. This also enables trip bail 43 to be moved clockwise as seen in FIG. 2. This clockwise rotation of trip bail 43 causes the collar 47 to be positioned to its original position, thereby latching the latching tip 50 of the lowered drive trip latch mechanism 49 in its "normal" position until another key is depressed.

FIG. 4 illustrates a schematic diagram of the clutch control system of the present invention. The phototransistor 79 of FIG. 3 is shown as having its emitter coupled to ground via lead 81 and to a $-12$ volt source of potential via a series path comprising a light emitting diode (LED) 83 and a resistor 85. The anode of the LED diode 83 is coupled to the emitter of phototransistor 79 and the cathode of the LED diode 83 is connected to one end of resistor 85 whose other end is connected to the $-12$ volt source of potential. The collector of the phototransistor 79 is coupled via lead 87 to the base input of a transistor 89. The base input of transistor 89 is connected through a resistor 91 to a $+5$ volt source of potential. The emitter of transistor 89 is connected to ground via lead 93 and the collector is coupled via lead 95 to the input of a NAND gate driver 97. The collector of transistor 89 is also connected via lead 95 and a resistor 99 to a $+5$ volt source of potential. The output of NAND gate driver 97 is connected to a common input node 101. The node 101 is also connected to the output of a NAND gate driver 103 which has an input 105 and to the output of NAND gate 107 which has an input 109. This provides for a logical "OR" function at the node 101 which serves as an input to a multivibrator-pulse absence detector 111 which may be a standard, off-the-shelf item such as a TTuL 9601 or the like. The delay multivibrator 111 is shown as having a capacitor 113 coupled between one input 115 and a second input. The input 115 is also coupled through a variable resistor 117 to a $+5$ volt source of potential. The output of the multivibrator 111 is connected via lead 119 to the input of a NAND gate driver 121 whose output is connected to the anode of a diode 123. The output of NAND gate 121 is also connected through a resistor 125 to a $+5$ volt source of potential. The cathode of diode 123 is connected to the base of an output transistor 127 and the base is also connected to ground through a resistor 129. The emitter of output transistor 127 is coupled directly to ground via lead 131 and the collector is coupled to an output node 133 via lead 135. Output node 133 is coupled to the anode of a diode 137 whose cathode is connected to a $+5$ volt source of potential and is coupled through a resistor 139 and lead 141 to a clutch coil 143 whose other end is connected to a $+5$ volt source of potential. The clutch coil 143 is the portion of the electromagnetic clutch of block 17 which is energized or de-energized to control the operation of the clutch.

In operation, the presence of a command signal at any of the inputs of NAND gates 97, 103 or 107, will cause a low pulse to appear at input node 101. This low will trigger the multivibrator-pulse absence detector 111 and cause it to continue to output a low signal on lead 119 so long as the multivibrator 111 continues to be reset by the presence of a low pulse at input node 101 within the time delay which is pre-set into the multivibrator 111. As long as one of the NAND gates 97, 103 and 107 continues to provide a low pulse to input node 101 before the delay pre-set into multivibrator 111 has elapsed, the low which is outputted on lead 119 will cause NAND gate 121 to supply a high to the base of transistor 127. This will cause transistor 127 to conduct and thereby provide an electrical control signal to the clutch coil 143. This energization of the clutch coil 143 will cause the clutch 17 to engage and enable the motor 15 to drive the decoder unit 13 as described hereinafter with reference to FIG. 5. When normal operation ceases, the required low pulses will no longer be supplied to input 101 before the pre-set delay has elapsed and a high will appear at the output of multivibrator 111. This high is inverted in NAND gate 121 and used to switch the transistor 127 to a non-conductive state, thereby de-energizing clutch coil 143 and causing the clutch 17 to disengage the motor drive from the decoder 13.

As indicated above, the low pulse which is required at input node 101 for clutch coil energization can be supplied via NAND gate 103 and 107 in addition to the photoelectric input from NAND gate 97. Inputs 105 and 109 are taken from block 33 of FIG. 1 which represents the remainder of the minicomputer itself. A command signal will be produced at input 105 when a restoration signal is generated a predetermined time after the machine is turned on to restore the decoder unit to its home position. Similarly, a command signal will be presented to input 109 whenever the minicomputer indicates that the machine is executing a program or other stored instructions which may require the use of the decoder unit. Those skilled in the art could generate these signals by any number of means and no invention or experimentation would be required.

Referring now to FIG. 5, the manner in which the main motor 15 drives the decoder, generally referred to as 13, is described in more detail. The master clutch 17 is coupled to the main motor 15 by a shaft or coupling means 19 for receiving continual rotational input therefrom. The intermittent rotary output of the master clutch 17 is controlled via energization of the master clutch coil under control signals received via line 29 from the control circuit 23, as previously described. When the master clutch 17 is energized, its rotational output may be imparted to the decoder 13 by coupling means or a drive belt 21. The drive belt 21 may be a continuous loop grooved drive belt transmitting rotational output from the main motor 15 through the master clutch 17 to a fly wheel 24 which in turn operates to provide rotational input to the decoder unit 13 via fly wheel shaft 26. The fly wheel shaft 26 in turn imparts rotary motion to the gear system 28 which in turn provides rotary power via gear shaft 18 which supports one of a plurality of eccentrically mounted decoder rings, as described in U.S. Pat. No. 3,250,446 which has already been incorporated by reference herein. It will be obvious to those of ordinary skill in the mechanical decoder art that various other drive systems may be used to provide power from the main motor 15 through the energized master clutch 17 to the decoder unit 13.

Although specific apparatus has been shown for the purpose of describing applicants' invention, it will be apparent to those skilled in the art that other variations and modifications in the specific structure illustrated may be made without departing from the spirit and scope of the present invention which is limited only by the appended claims.

What is claimed is:

1. A decoder clutching system for use in a system employing a decoder, a continuously rotating main motor, and means responsive to the continuous rotation of the main motor for rotatably driving said decoder, comprising:

- an electromagnetic master clutching means coupled between said main motor and said decoder driving means, said master clutching means having a clutch coil energized in response to an electrical control signal for engaging said clutching means upon energization of said clutch coil to enable said continuously rotating main motor and driving means to rotatably drive said decoder only during said engagement of said master clutching means;
- means for anticipating desired operation of said decoder;
- means responsive to said anticipated desired decoder operation for generating an electrical command signal indicative of said anticipated desired decoder operation; and
- logical control means responsive to said electrical command signal for generating said electrical control signal to energize said clutch coil, said logical control means comprising:
  - delay multivibrator means presettable with a predetermined delay period and responsive to the arrival of a reset pulse at its input for restarting said delay period and maintaining a first output state while said reset pulse arrives before said delay period elapses and said delay multivibrator means also responsive to the absence of said reset pulse at its input during said delay period for switching to a second output state and maintaining said second output state during the absence of said reset pulse;
  - input gating means responsive to said command signal for supplying said reset pulses to said input of said delay multivibrator means; and
  - control output means responsive to the first output state of said delay multivibrator means for providing said electrical control signal to said clutch coil and said control output means also responsive to said second output state of said delay multivibrator means for removing said electrical control signal from said clutch coil, thereby de-energizing said clutch coil, said control output means comprising:
    - a NAND gate driver having its input coupled to the output of said delay multivibrator means;
    - biasing means coupled to the output of said NAND gate driver;
    - output transistor means having its base coupled to said output of said NAND gate driver means, its emitter coupled to ground and its collector coupled to said clutch coil, said output transistor means being responsive to said first output state of said delay multivibrator means for switching to a conductive state for providing said electrical control signal to said clutch coil to energize said clutch coil and said output transistor means also being responsive to said second output state of said delay multivibrator means for switching to a non-conductive state for removing said electrical control signal from said clutch coil to de-energize said clutch coil.

2. In a minicomputer system having a keyboard means, a decoder, and a motor for rotatably driving said decoder, said keyboard means including a drive trip latch mechanism shifted from a normally latched position to a released position, in response to the depression of a key in said keyboard means, wherein the improvement comprises:

- master clutching means coupled to said motor, said clutching means being energized for engaging said decoder with said motor to transfer the rotational driving force from the motor to the decoder and being de-energizable for disengaging the motor drive from said decoder;
- means for generating a control signal; and
- clutch control means responsive to the presence of said control signal for energizing said master clutching means and said clutch control means also responsive to the absence of said control signal for de-energizing said master clutching means, wherein said clutch control means comprises:
  - delay multivibrator means presettable with a predetermined delay interval, said delay multivibrator means being responsive to the arrival of a reset pulse at its input within said predetermined time interval for maintaining a first output state, and being responsive to the absence of said reset pulse at said input during said predetermined time interval for switching to a second output state and maintaining said second output state during said absence of said reset pulse;
  - input means responsive to said control signal for supplying said reset pulse to said input of said delay multivibrator means; and
  - output means responsive to said first output state of said delay multivibrator means for energizing said master clutching means and responsive to said second output state of said delay multivibrator means for de-energizing said master clutching means, and wherein said output means comprises driver means having its input coupled to the output of said delay multivibrator means, and output transistor means having its base coupled to the output of said driver means, its emitter coupled to ground, and its collector coupled to said master clutching means, said output transistor means being responsive to said first output state of said delay multivibrator means for switching to a conductive state and energizing said master clutching means and said output transistor means also being responsive to said second output state of said delay multivibrator for switching to a non-conductive state for de-energizing said master clutching means.

3. The improved minicomputer system of claim 2 wherein said means for generating a control signal comprises electromechanical means responsive to said key depression for generating said control signal.

4. The improved minicomputer system of claim 3 wherein said means for generating said control signal comprises:

extension means having at least one reflective surface thereon, said extension means attached to said drive trip latch mechanism for movement therewith;

photoelectric means responsive to said movement of said extension means with said drive trip latch mechanism to said released position for reflecting a beam of light from said reflective surface to said photoelectric means for receiving said reflected beam of light and generating a photoelectric means output signal in response thereto; and transistor means responsive to said photoelectric means output signal for generating said control signal and supplying said control signal to said input means.

5. A decoder clutching system for use in a system employing a decoder, a continuously rotating main motor, and means responsive to the continuous rotation of the main motor for rotatably driving said decoder, comprising:

an electromagnetic master clutching means coupled between said main motor and said decoder driving means, said master clutching means having a clutch coil energized in response to an electrical control signal for engaging said clutching means upon energization of said clutch coil to enable said continuously rotating main motor and driving means to rotatably drive said decoder only during said engagement of said master clutching means;

means for anticipating desired operation of said decoder;

means responsive to said anticipated desired decoder operation for generating an electrical command signal indicative of said anticipated desired decoder operation; and logical control means responsive to said electrical command signal for generating said electrical control signal to energize said clutch coil, wherein said system which includes said decoder further includes a keyboard assembly having depressible keyboard keys, means for detecting a depression of one of said depressible keyboard keys, said detecting means responsive to said detected depression for providing an electrical alert signal; and wherein said electrical command signal generating means is responsive to said electrical alert signal to generate said electrical command signal and wherein said depression detection means comprises:

a mechanical latching means having a normally latched position and being responsive to the depression of said keyboard key for shifting to a second released position;

reflective means attached to said mechanical latching means for motion therewith;

phototransistor means responsive to said reflective means for generating a phototransistor signal when said latching means shifts to said second released position; and transistor means for coupling said phototransistor signal to said input gating means for providing said input gating means with said electrical alert signal.

* * * * *

UNITED STATES PATENT OFFICE
CERTIFICATE OF CORRECTION

Patent No. 4,064,388 Dated December 20, 1977

Inventor(s) Edwin O. Roggenstein & Chockalingam Manthiram

It is certified that error appears in the above-identified patent and that said Letters Patent are hereby corrected as shown below:

Col. 3, line 62, should read --bail 43--.
Col. 4, line 7, should read --as known--.

Signed and Sealed this

*Twenty-eighth* Day of *March 1978*

[SEAL]

*Attest:*

RUTH C. MASON
*Attesting Officer*

LUTRELLE F. PARKER
*Acting Commissioner of Patents and Trademarks*